United States Patent [19]

Avakov

[11] Patent Number: 5,094,340

[45] Date of Patent: Mar. 10, 1992

[54] GRIPPER BLOCKS FOR REELED TUBING INJECTORS

[75] Inventor: Vladimir A. Avakov, Carrollton, Tex.

[73] Assignee: Otis Engineering Corporation, Dallas, Tex.

[21] Appl. No.: 615,428

[22] Filed: Nov. 16, 1990

[51] Int. Cl.$^5$ .................................... B65G 15/14
[52] U.S. Cl. ........................... 198/626.1; 198/620; 198/604; 198/803.01
[58] Field of Search ............... 198/604, 620, 626.1, 198/688.1, 699.1, 803.01

[56] References Cited

U.S. PATENT DOCUMENTS

| | | | |
|---|---|---|---|
| 1,355,449 | 10/1920 | Campbell | 198/620 X |
| 2,679,924 | 6/1954 | Powell | 203/227 |
| 3,108,682 | 10/1963 | Zipper | 198/626.1 |
| 3,258,110 | 6/1966 | Pilcher | 198/162 |
| 3,285,485 | 11/1966 | Slator | 226/172 |
| 3,559,905 | 2/1971 | Palynchuk | 242/54 |
| 3,754,474 | 8/1973 | Palynchuk | 74/162 |
| 3,869,038 | 3/1975 | Piper et al. | 198/626.1 |
| 3,945,547 | 3/1976 | Ledebur | 198/620 X |
| 4,064,987 | 12/1977 | Rowan | 198/604 |
| 4,515,220 | 5/1985 | Sizer et al. | 166/384 |
| 4,655,291 | 4/1987 | Cox | 166/385 |
| 4,787,505 | 11/1988 | Tweedy | 198/803.01 |

FOREIGN PATENT DOCUMENTS 0679175  6/1966  Belgium .......................... 198/626.1
0897383  5/1962  United Kingdom ............... 198/604

OTHER PUBLICATIONS

W. C. Mauer & W. C. Herben, Deep Earth Sampling System–Phase I, Final Report, (National Science Foundation, Jun. 1990, TR 90-8).

SKF Vertical Wedge Chain Conveyor, Product News from Flex-Link-No. 1, Sep. 1984.

*Primary Examiner*—Robert P. Olszewski
*Assistant Examiner*—James R. Bidwell
*Attorney, Agent, or Firm*—Albert W. Carroll

[57] ABSTRACT

An improved gripper unit for use in an injector for handling coil tubing, pipe, rod, cable, or similar elongate objects, this gripper unit being provided with gripping surfaces which contact the coil tubing in V-block fashion and thus will grip such tubing of differing diameters. This gripper unit will enable the injector to support a given load while applying less squeeze. In the case of handling coil tubing or pipe, the stresses induced by these improved gripper blocks are very considerably reduced as compared with conventional gripper blocks.

18 Claims, 5 Drawing Sheets

GRIPPER BLOCKS FOR REELED TUBING INJECTORS

BACKGROUND OF THE INVENTION

1. Field of the Invention

This invention relates to well tools, and more particularly to gripper units for use in injectors for coiled or reeled tubing, or similar elongate objects.

2. Related Art and Information

Reeled or coil tubing has been run into wells for many years for performing certain downhole operations such as, for instance, washing out sand bridges, circulating treating fluids, setting downhole tools, cleaning the internal walls of well pipes, conducting producing fluids or lift gas, and a number of other similar remedial or production operations. In addition, such injectors have been found useful in performing operations in horizontal and slanted wells.

Use of such reeled or coil tubing saves much time and money because the reeled tubing injectors force the reeled tubing into the well through a seal such as a stripper head, and may do so continuously and at a good rate of speed. Since the tubing is in one piece, time is not lost in having to make up a threaded connection about every 20 to 30 feet (6.1 to 9.14 meters) such as when jointed pipe is used. Further, such injectors can be moved to be jobsite, set up, and moved off the job much quicker and less costly than can drilling rigs or workover rigs.

Many such reeled tubing injectors are in common use today and a number of patents relating thereto have been issued. Typically, most of the reeled tubing injectors utilize a pair of opposed endless drive chains which are arranged in a common plane. Such drive chains are made up of links, rollers and gripper blocks. In some cases gripper inserts are used. These drive chains are generally driven by sprockets powered by a motor, such as a reversible hydraulic motor. The opposed drive chains grip the reeled tubing between them. These drive chains are backed up so that a goodly number of pairs of opposed gripping blocks are in gripping engagement with the tubing at any given moment. As the chains are in motion and the tubing is being driven, each time a pair of gripper blocks is actuated to release their hold on the tubing another pair is actuated to gripping position. The moving drive chains are thus able to force the tubing into the well, or to remove the same therefrom depending upon the direction in which they are driven.

A number of patents have been issued relating to reeled or coil tubing injectors. Among those are the following U.S. Pat. Nos.:

2,679,924 3,258,110 3,285,485 3,559,905
3,754,474 4,515,220 4,655,291

U.S. Pat. No. 2,679,924 which issued to P. R. Powell on June 1, 1954 for "STRAND-ADVANCING APPARATUS" discloses an apparatus employing a pair of opposed drive chains each having a multiplicity gripping shoes for gripping and moving a strand, cable, or the like, as the chains are driven. The gripper shoe 20 is shown in FIG. 5 to have a concave groove for engaging and gripping the cable, or the like, being moved. This groove has a radius slightly larger than the radius of the largest object to be moved. (Col. 2).

U.S. Pat. No. 3,258,110 issued to D. W. Pilcher on June 28, 1966 for "ENDLESS CHAIN APPARATUS". This patent discloses opposed drive chains having gripping elements 15 with concave gripping surfaces. (Col. 2 and FIG. 2).

U.S. Pat. No. 3,285,485 issued to D. T. Slator on Nov. 15, 1966 for "APPARATUS FOR HANDLING TUBING OR OTHER ELONGATE OBJECTS". This patent discloses drive chains including gripper units (FIG. 6-7) which are connectable one to another by the pins 15 which also pass through the chain links 11a and rollers 11b. (Col. 3, line 10 et seq.). This U.S. Pat. No. 3,285,485 is hereby incorporated herein for all purposes.

U.S. Pat. No. 3,559,905 issued on Feb. 2, 1971, to Alexander Palynchuk for "METHOD AND APPARATUS FOR RUNNING AND PULLING A CONTINUOUS METAL MEMBER INTO AND OUT OF A WELL". This patent discloses a track assembly 2 including opposed sprocket chains 10 each having gripping pads 11. (Col. 4, lines 42, et seq.) (FIGS. 10-12). Elements 41 which frictionally grip the rod 4 "will preferably be made of somewhat flexible material in order that it may be used with rod strings of varying diameters. An element formed of urethane elastomer having a Shore durometer range of D-50 has been shown to be suitable." (Col. 5, lines 32-39).

U.S. Pat. No. 3,754,474 issued to Alexander Palynchuk on Aug. 28, 1973 for "GRIPPER PAD". This patent discloses a gripper unit for use in an apparatus such as that disclosed in U.S. Pat. No. 3,559,905, just mentioned. This gripper unit includes "a gripper pad 3 which includes a block 4 having studs 5 embedded therein. (Col. 2, lines 33-34). Block 4 is of a deformable elastomer material (line 43) and studs 5 are "of a metal softer than steel, preferably aluminum or aluminum alloy." (Col. 3, lines 6-16). U.S. Pat. No. 3,754,474 is incorporated into this application by reference for all purposes.

U.S. Pat. No. 4,515,220 issued on May 7, 1985 to Phillip S. Sizer, Don C. Cox, and Malcolm N. Council for "APPARATUS AND METHOD FOR ROTATING COIL TUBING IN A WELL". This patent discloses a reeled or coil tubing injector which can handle coil tubing and also handle jointed pipe on the upper end thereof, even rotate it in a well. While the gripping blocks on the chains will grip both the coil tubing and the quill through which the pipe is run, the grippers grip only one size. Their gripping surfaces are concave or semi-circular in section. The quill is provided with ridges which are the same radius as the coil tubing. (See in FIG. 17 coil tubing 50 and in FIG. 20 the quill 75). This U.S. Pat. No. 4,515,220 is incorporated herein by reference for all purposes.

U.S. Pat. No. 4,655,291 issued to Don C. Cox on Apr. 7, 1987 for "INJECTOR FOR COUPLED PIPE". The disclosed apparatus utilizes the same type of drive chains and gripper blocks as does the apparatus of U.S. Pat. No. 4,515,220 just mentioned. This U.S. Pat. No. 4,655,291 is incorporated herein by reference for all purposes.

Publication "DEEP EARTH SAMPLING SYSTEM-PHASE I", Final Report of National Science Foundation, dated June 1990 and published by MAURER ENGINEERING INC., Houston, Tex., discloses various concepts for handling tapered strings of coil tubing. These concepts are: use of stacked injectors, each adapted for a different size of tubing (page 20); an injector having two independent mechanisms to handle two sizes of tubing (page 21); gripper units having three sizes of gripper grooves side by side for handling three sizes of tubing. The drive chains of this apparatus would need to be shifted laterally for each diameter change (page 21); and gripper blocks for accommodating two sizes of tubing through providing gripper blocks for small tubing with a second, larger radius to fit a larger diameter tubing (page 26).

None of the prior art of which applicant is aware teaches or suggests gripper blocks for reeled or coil tubing which will provide an adequate grip with less squeeze and which will grip tubing or similar objects of various sizes.

Grippers for reeled or coil tubing generally have been formed either from an elastomeric material which would conform to the shape of the tubing exterior and take a friction grip thereof, or formed of steel and provided with notches having a radius slightly greater than that of the tubing. These steel grippers took a vise-like grip on the tubing and although they fit the tubing fairly closely, excessive squeeze often resulted in the tubing being distorted to an out-of-round condition and scarred. The problem was that the squeeze was applied to the tubing at two points opposite each other at 180 degrees apart. Early failure of the tubing and the stripper seals is understandable.

Such grippers are used extensively today, and since it is known that they can distort and scar the tubing, and since longer strings of tubing are needful in the industry, it has been desirable to provide improved grippers for reeled tubing which will overcome the shortcomings of the existing grippers, and at the same time readily grip tubings of various diameters. The present invention is an improvement over the gripping blocks used in the known prior art and overcomes many of the shortcomings associated therewith, and are more suitable for use in the modern oil industry where wells are deeper, conditions more severe, operations more costly, and damaged or ruined reeled tubing can cause considerable delays and added costs.

SUMMARY OF THE PRESENT INVENTION

The present invention is directed toward a gripper block for use in grippingly engaging a coil tubing, pipe, rod, cable, or the like object for applying a longitudinal load thereto, such gripper block having means at or near its opposite ends for attachment to an endless chain of an injector apparatus, the gripper block having a pair of gripper surfaces formed thereon, these gripper surfaces being elongate surfaces and tilted toward each other to diverge, toward the tubing to be gripped, at approximately 90 degrees. These gripper surfaces thus provide a V-block in effect. In one embodiment of this invention the elongate gripper surfaces are provided with multiple grooves providing multiple gripper ridges running crosswise thereof, that is, relative to the tubing axis.

It is therefore one object of this invention to provide an improved gripper block for use in an injector apparatus which is provided with a pair of flat gripping surfaces which are tilted with respect to one another to form a V-groove for receiving the tubing to be gripped.

Another object is to provide a gripper block of the character described having crosswise grooves formed in the gripping surfaces to provide ridges for contacting the outer surface of the tubing.

Another object is to provide such a gripper in which the two gripping surfaces are separated slightly to provide a flat or similar surface at the bottom of the V-groove.

Another object is to provide a gripper block of the character described which will grip tubing, pipe, cable, or the like, of various diameters.

Other objects and advantages will become apparent from reading the description which follows and from studying the accompanying drawings wherein:

DESCRIPTION OF THE PREFERRED EMBODIMENTS

Figure 1:
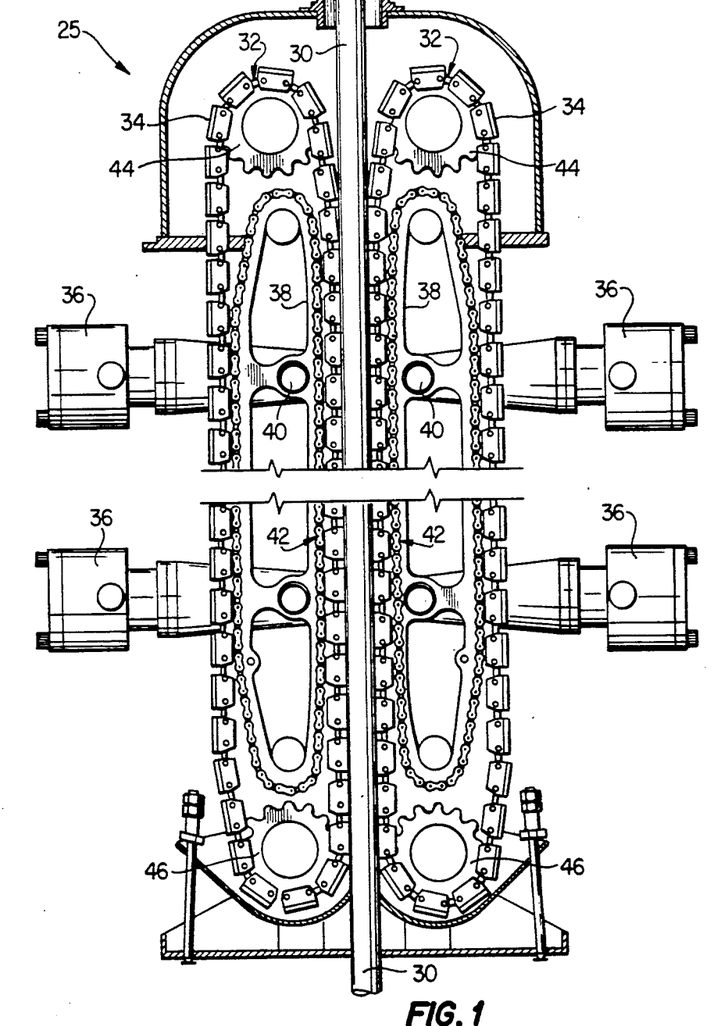
FIG. 1 is a schematical view showing a coil tubing injector with a portion of coil tubing gripped between the drive chains thereof.

Referring now to FIG. 1, it is seen that a reeled or coil tubing injector is shown schematically. The coil tubing injector is indicated generally by the reference numeral 25 and is shown gripping a coil tubing 30.

A pair of endless drive chains 32 each carrying a multiplicity of gripper blocks 34 are shown on opposite sides of the coil tubing 30. The gripper blocks are pressed against the coil tubing by hydraulic cylinders 36 biasing the pressure beams 38 inwardly through trunnions 40. A roller chain 42 is interposed between the pressure beams 38 and the drive chains 42 to reduce friction therebetween.

It is easy to see that the drive chains 32 are actuated by sprockets 44 which are powered as by reversible hydraulic motors (not shown). Idler sprockets 46 take up slack in chains 32.

It is readily seen that many pairs of opposed gripper blocks 34 along the pressure beams are in contact with and grip the coil tubing at any one moment during the time that the pressure beams 38 are pressed toward each other by the hydraulic cylinders 36. The squeeze thus applied to the coil tubing by the gripper blocks is varied by adjusting the hydraulic fluid pressure.

Figure 2:
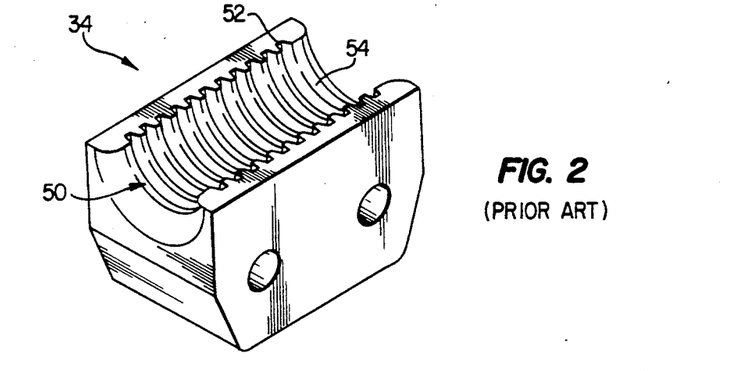
FIG. 2 is a perspective view of a gripper block such as used in the coil tubing injector of FIG. 1.

Referring now to FIG. 2, it will be seen that a gripper block such as that used on the apparatus 25 of FIG. 1 is shown and is indicated by the reference numeral 34. This gripper block is seen in the end view of FIG. 3 to have a concave or semi-circular gripping surface 50 and that this gripping surface is provided with spaced apart grooves 52, seen in FIGS. 2 and 4 which leave ridges or lands 54 therebetween. These grooves and lands provide a better grip on the coil tubing; the lands engage the outer surface of the tubing, distributing the stress over a large area while providing higher unit loading at the lands. At the same time, the grooves provide space for the accommodation of oil, grease, paraffin, and other materials which may be carried on the coil tubing and displaced as the lands grip the tubing's outer surface.

Figure 3:
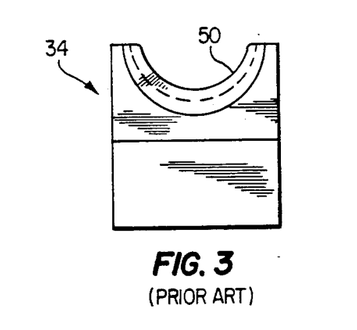
FIG. 3 is an end view of the gripper block of FIG. 2.
Figure 4:
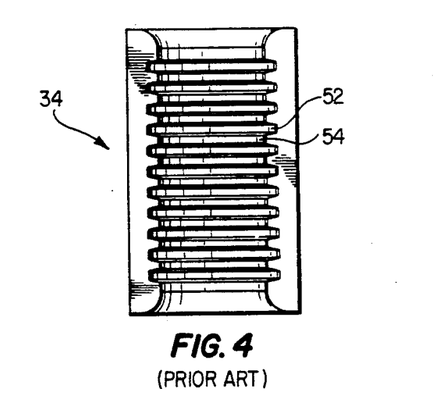
FIG. 4 is a top view of the gripper block seen in FIG. 3.

The radius of curvature of the gripping surface 50 is preferably slightly greater than the radius of the coil tubing.

Figure 5:
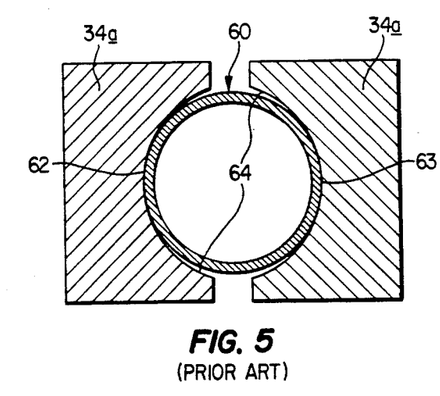
FIG. 5 is a schematical sectional view showing a section of coil tubing grippingly engaged between a pair of gripper blocks such as the gripper block of FIGS. 2-4.

Referring now to the schematic view of FIG. 5, it is seen that a coil tubing 60 is engaged on opposite sides by gripper blocks 34a which may be exactly like the gripper blocks 34 of FIG. 2. The gripper blocks are shown applying inwardly directed forces to the tubing at opposite locations indicated by the reference numerals 62 and 63. Inwardly directed forces of a given value thus applied to the tubing through the gripper blocks enable the apparatus to support an axially directed load of given value to which the tubing is subjected. Insufficient squeeze may result in slippage; and excessive squeeze may result in damage to the tubing.

Figure 6:
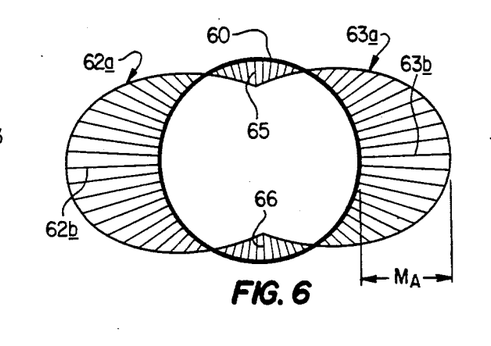
FIG. 6 is a diagramatic view illustrating the bending moments resulting from stresses induced into the tubing as a result of being gripped by the gripper blocks as in FIG. 5.

The inward bias of the gripper blocks 34a induce stresses into the tubing at the points 62, 63 which are 180 degrees apart. The radius of the gripping surface 64 is slightly greater than that of the tubing outer surface. In FIG. 6, the diagram of the bending moments induced into the tubing 60 as a result of such inwardly directed loads are represented by the curves at 62a and 63a. The ordinates of these curves 62a and 63a, as seen at 62b and 63b, for instance, represent to scale the resulting induced bending moments.

It is readily seen that there is a tendency for such forces to distort the tubing, that is, to bend the wall thereof and mash the tubing out of round.

On the other hand, the ordinates at 65 and 66 indicate a tendency for the tubing wall to bulge outwardly at those locations which are located 90 degrees from points 62, 63.

Gripper blocks of this invention do not tend to distort the tubing so readily as might the gripper blocks seen in FIGS. 3-6.

Figure 7:
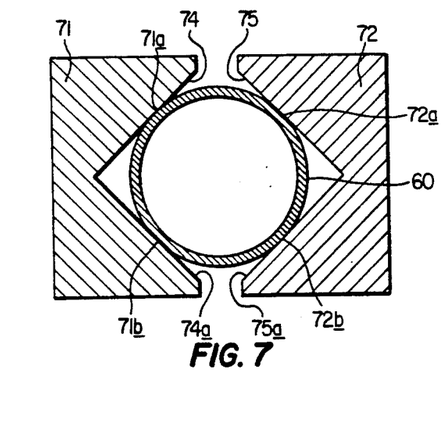
FIG. 7 is a view similar to that of FIG. 5, but showing gripper blocks which grip the exterior of the tubing with four-point loading rather than two-point loading as seen in FIG. 5.

Gripper blocks of this invention are shown schematically in FIG. 7 where they are indicated by the reference numerals 71 and 72. Gripper block 71 is provided with gripping surfaces 74, 74a. Gripper block 72 is provided with gripping surfaces 75, 75a. These gripper surfaces of each gripper block are tilted with respect to each other to diverge toward the tubing to form an included angle of approximately 90 degrees. The opposed gripper blocks 71, 72 are shown applying inwardly directed forces to a coil tubing. such as coil tubing 60 to effect a frictional grip. These inwardly directed gripping forces are directed at four locations spaced at 90 degrees around the tubing, as at points 71a, 71b, 72a, and 72b. Thus, these inwardly directed forces are noticeably much better distributed about the tubing than were the two opposed inward forces in the case of FIGS. 5 and 6.

Figure 8:
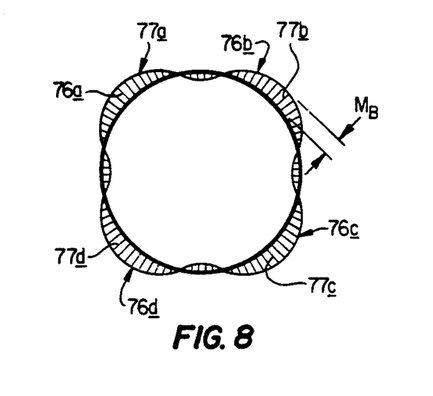
FIG. 8 is a diagramatic view similar to that of FIG. 6, but illustrating the bending moments which result from the gripping of the tubing as seen in FIG. 7.
Figure 9:
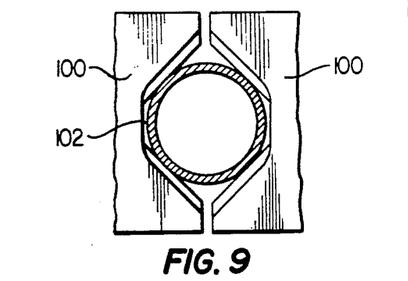
FIGS. 9-12 are schematical views similar to FIG. 7 showing that gripper blocks providing four-point loading have the ability to grip tubings, and other similar objects, of various diameters.

In FIG. 8, the bending moments induced into tubing 60 as a result of such inwardly directed forces are shown by curves 76a, 76b, 76c, and 76d. The ordinates of these curves as seen at 77a, 77b, 77c, and 77d represent to scale the resultant induced bending moments.

It is readily understood that the gripper blocks of FIG. 5 are much more apt to apply inwardly directed forces which would exceed the yield strength of the tubing than would the gripper blocks of FIG. 7.

Comparing the maximum moment ordinate, $M_A$, seen in FIG. 6 with the maximum moment ordinate, $M_B$, seen in FIG. 8, it is seen that the gripper blocks 71, 72 of FIG. 7 greatly reduce the induced stresses over those induced by the gripper blocks 34a of FIG. 5. If $M_A = 0.3183$ and $M_B = 0.0683$, then $M_A$ divided by $M_B$ would equal 4.66.

This means that the bending stresses induced by the two-point loads, as in FIG. 5, are 4.66 times as great as those induced by the four-point loads, as in FIG. 7.

Further, it is noted that since each of the gripper blocks 71, 72 has a pair of gripper surfaces 75 which are tilted to form an included angle of 90 degrees and thus contact the tubing 60 at two points 72a, 72b which are 45 degrees from the centerline passing through the point where the pair of gripping surfaces meet, then the load applied to the gripper block is divided in two and applied at this 45 degree angle. Thus, the four point load applied to the tubing 60 in FIG. 7 is only about 70 percent of the load applied to the tubing 60 in FIG. 5. Thus, if the load applied by each of the gripper blocks in FIG. 5 is Q, then the load applied by each of the gripper blocks in FIG. 7 is 0.707Q.

Thus, if the two-point load is Q, the four-point load will be 0.707Q, or 70.7 percent.

Thus, the gripper blocks of this invention provide the necessary grip or load-holding power with only about 70 percent of the lateral loading or squeeze on the tubing.

Not only do the gripper blocks of this invention permit less squeeze for the same axial-load capacity, but this understandably translates into less damage to the tubing and longer life therefor, as well as making its use safer.

Further, the gripper blocks of this invention are capable of engaging and supporting tubing, or similar elongate objects, of differing diameters, and this without shifting anything, even the gripper blocks themselves.

Figure 10:
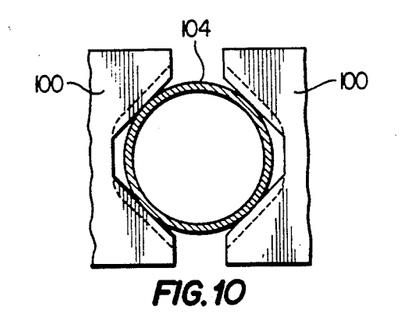
Figure 11:
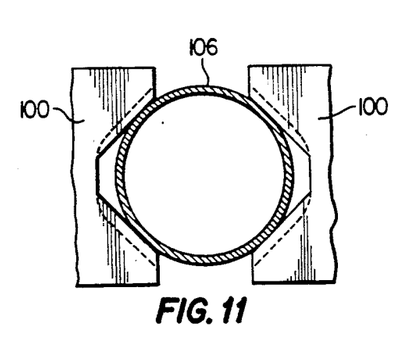

Referring now to schematic FIGS. 9-12, it is seen that a pair of gripper blocks 100 are shown gripping a tubing 102 of say one-inch (2.54 centimeters) in diameter and providing four-point loading as discussed hereinabove. Similarly, the same gripper blocks 100 are shown in FIG. 10 gripping a tubing 104 of say 1.25 inches (3.175 centimeters) in diameter and similarly in FIG. 11 the diameter of tubing 106 is say 1.5 inches (3.81 centimeters) in diameter, while similarly in FIG.

Figure 12:
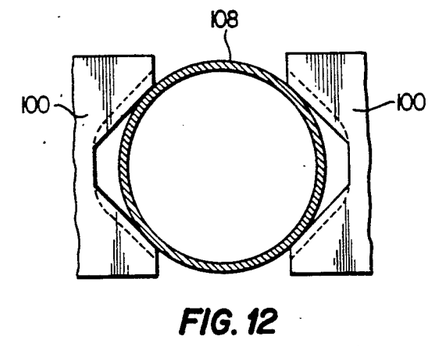

12 the diameter of the tubing 108 is say 1.75 inches (4.445 centimeters).

In each case shown in FIGS. 9-12, it is clear that the conditions are the same, that the four-point loads are applied in the same manner, and that the four points are always 90 degrees apart and 45 degrees from the center of the V-grooves. It is clearly shown that the gripper blocks 100 are adapted to engaging tubings having an appreciable range of diameters.

A gripper block of this invention is illustrated in FIGS. 13-16 where it is indicated generally by the reference numeral 150.

Figure 13:
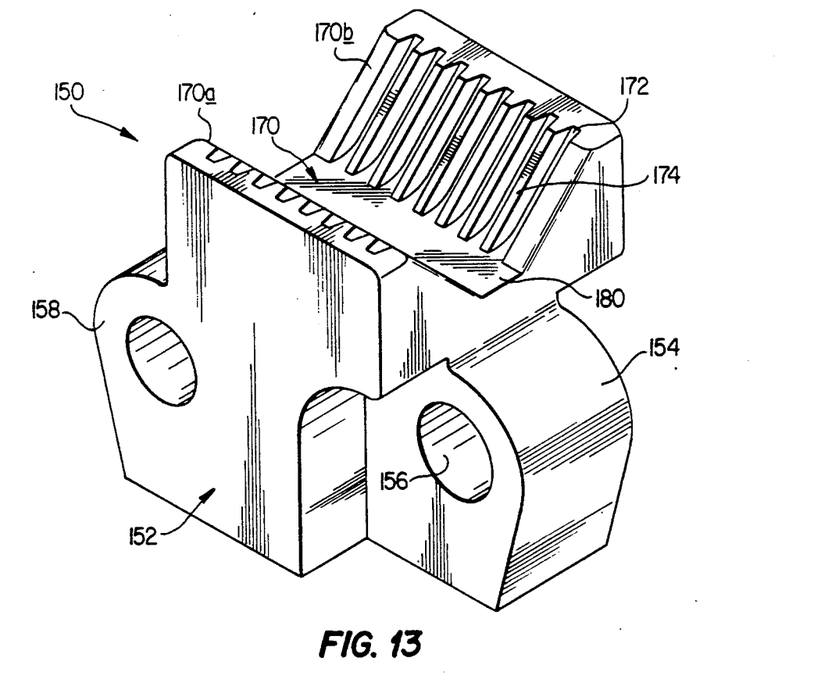
FIG. 13 is a perspective view of a gripper block constructed in accordance with the present invention.
Figure 14:
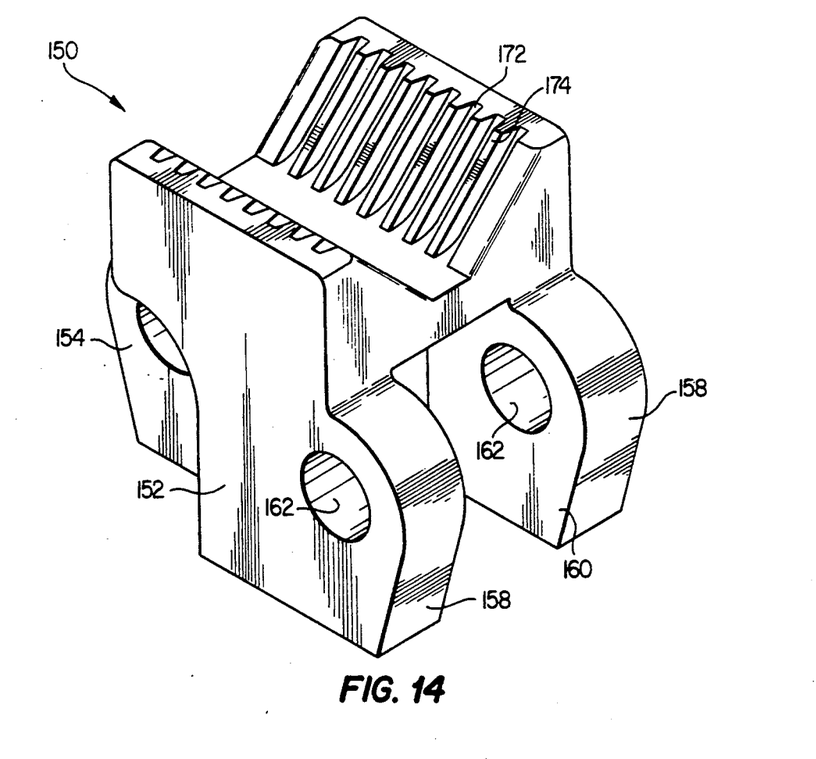
FIG. 14 is a view similar to that of FIG. 1 but showing the gripper block turned about end for end.

In FIG. 13 it is seen that the gripper block 150 is provided with a body 152 having a tongue 154 with a pin hole 156 extending transversely therethrough. In FIG. 14, the gripper block 150 is seen to be turned end-for-end or 180 degrees. A pair of spaced-apart ears 158 provide a slot 160 therebetween which is adapted to receive the tongue 154 of another adjacent gripper block. The ears 158 are each provided with a pin hole 162 and these holes are aligned. When two such gripper blocks are mated with the tongue 154 of one in position between the ears of the other, a pin can be placed in the aligned holes 156 and 160 to flexibly connect the two gripper blocks together so that they may articulate. Many such links are connectable together to form a chain such as that used in a coil tubing injector, for instance, such as that seen in FIG. 1.

Since the gripper block 150 is a complete gripper unit only one pin will be needed for each gripper block.

Although the gripper portion of the gripper block could be formed separately and then secured to the main body portion, it is preferable to form the gripper block in a single piece since its ability to grip various sizes of tubing fairly obviates replacing the drive chain when a tubing of different diameter is to be handled.

The gripper block illustrated in FIGS. 13-16 is formed with a V-groove as at 170 providing planar surfaces 170a and 170b which are tilted relative to one another. It is preferable for these two surfaces 170a to form an included angle of approximately 90 degrees, however other similar angles would work but with lesser efficiency. Thus, the gripping surfaces of each of the gripper blocks 150 will engage the exterior of a cylindrical object, such as a tubing, at two points, as seen in FIGS. 7 and 9-12, the pair of gripping blocks clearly providing four-point contact. Where these slanted planar gripping surfaces are let to remain without grooves, they would grip the tubing but grease, paraffin, mud, dirt, and other such material might interfere with the efficiency, dependability, and safety of their performance.

Preferably, these slanted gripping surfaces 170a and 170b are each formed with a suitable number of grooves such as groove 172. These grooves 172 extend perpendicularly to the longitudinal axis of the gripper block body and are spaced apart to provide suitable ridges, such as at 174 for engaging the tubing. The grooves 172 provide space for receiving the grease, paraffin, mud, et cetera, which may be carried on the tubing's exterior and which may be displaced therefrom in the gripping operation. These ridges 174 and grooves 172 are preferably shaped to provide adequate strength. As illustrated in FIGS. 13 and 14, the ridges 174 and grooves 172 have a profile resembling the thread form of an Acme thread. (An Acme thread has sloping sides with flats at both crests and roots.) Preferably this profile approximates a Acme thread having four threads per inch (25.4 millimeters). The profile of these ridges and grooves may, however, be designed to fit particular needs if desired.

Figure 15:
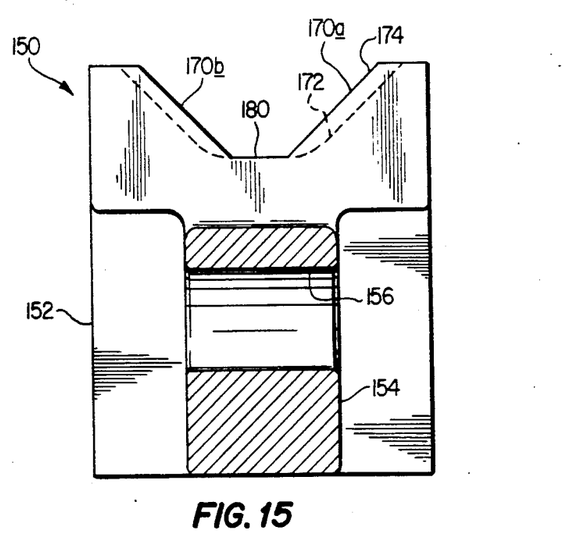
FIG. 15 is an end view of the gripper block of FIGS. 14-15.

The V-groove 170 formed by the tilted gripping areas 170a and 170b may stop short of intersecting, as seen in FIG. 15, if the gripper blocks will not be required to grip tubing of very small diameter. Therefore, the V-groove 170 is preferably formed with a ridgeless bottom surface which may be flat, as shown at 180, or concave, as desired.

Preferably, the grooves 172 separating the ridges 174 are spaced apart from about 0.18 inch (4.57 millimeters) to about 0.38 inch (9.7 millimeters), but may be formed as desired.

The ridgeless area 180 at the bottom of the V-groove preferably is formed with a width about 7 to about 30 percent the width of the gripper body means, but certainly may be formed as desired.

Figure 16:
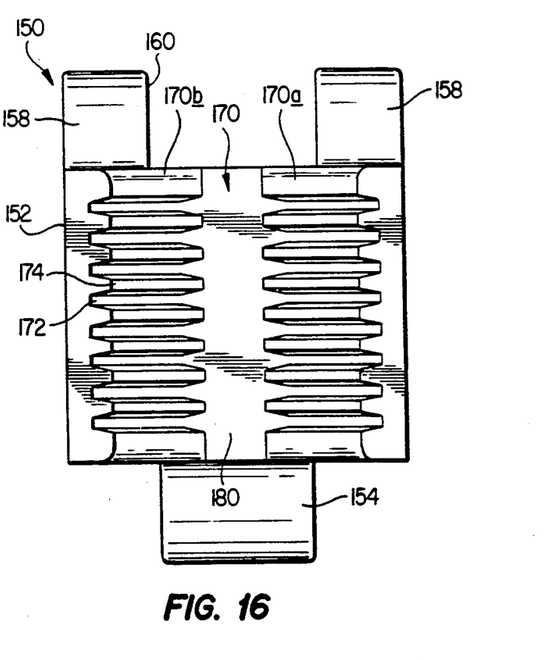
FIG. 16 is a top view of the gripper block shown in FIG. 15 with the tongue 154 thereof shown in section.
Figure 17:
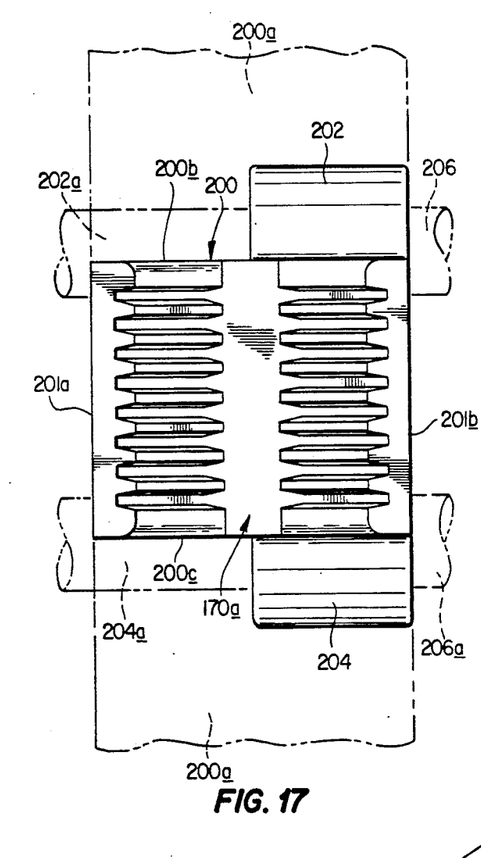
FIG. 17 is a view similar to that of FIG. 16 but showing a modified form of gripper block embodying the present invention.

In FIG. 17, a modified form of gripper block is illustrated and is indicated generally by the reference numeral 200. It is formed with first and second ends, 200b and 200c, and with first and second sides, 201a and 201b. Gripper block 200 is very similar to the gripper blocks disclosed hereinabove differing only in its ears; the V-groove gripping means 170a is the same as the gripping means 170 of the gripper block 150. Gripper block 200 is provided with but one ear on each of its opposite ends. Thus, as shown, an ear 202 is provided at the first end 200b and a like ear 204 is provided at the second end 200c of the gripper block. Both of the ears 202, 204 are shown on the second side 201b of the gripper block, as seen in FIG. 16 and are substantially half as wide as the gripper block. Each of these ears is provided with a suitable hole for receiving a pin 206 when assembling the gripper block in a drive chain. Since both of the ears 202, 204 are on the same side of the gripper block, an identical block can be turned around so that both of its ears are on the left side so as to become mateable with either end of the gripper block 200.

A fragment of phantom upper and lower gripper blocks are shown assembled to each end of gripper block 200. These phantom gripper blocks are both identified by the reference numeral 200a. It is clearly shown that the ear 202a of upper gripper block 200a is positioned next to gripper block 200 so that the holes (not shown) thereof are in alignment and that pin 206 links the gripper blocks together in chain fashion. Similarly, ear 204a of lower gripper block 200a is linked to ear 204 as by pin 206a.

It is readily understood that in the manufacture of gripper blocks, such as gripper blocks 200, the holes can be formed more economically and in less time with, perhaps, less expensive and/or less sophisticated tooling. It is particularly important that it is not necessary in such case to drill, grind, or otherwise form aligned holes in two spaced apart ears, such as the spaced apart ears 158 of the gripper block 150 of FIGS. 13-14.

Figure 18:
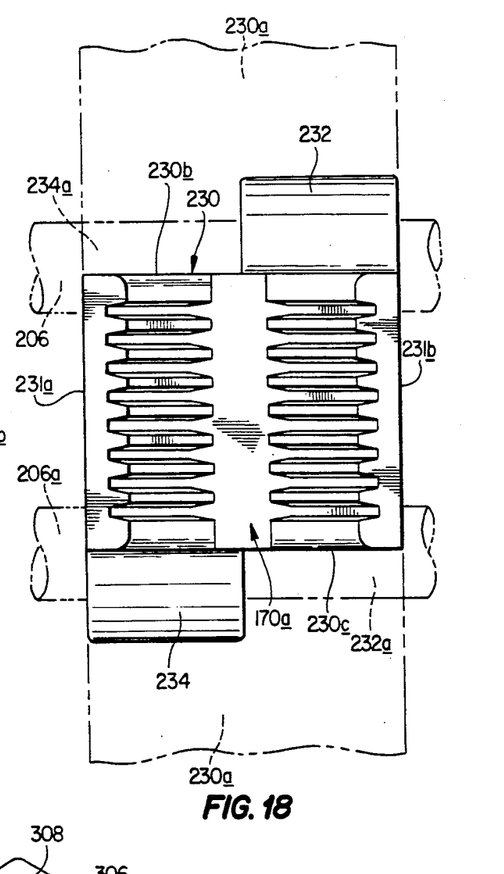
FIG. 18 is a view similar to that of FIG. 16 but showing a different modification of a gripper block embodying the present invention.

Referring now to FIG. 18, it is seen that another modified form of gripper block is illustrated and is identified by the reference numeral 230. Gripper block 230 is generally similar to the gripper block 200 just described with respect to FIG. 17, being formed with first and second ends, 230b and 230c, and with first and second sides, 231a and 231b. Gripper block 230 is provided with an ear 232 at its upper right corner as seen in FIG. 18 and this ear 232 is exactly like the ear 202 on gripper block 200. Gripper block 230 is similarly provided with an ear 234 at its lower end, but at its lower left corner. Thus, ear 234 is at the opposite corner from ear 232, and is not on the same side of the gripper block as in FIG. 17. Ears 232 and 234 are identical and interchangeable.

In assembling gripper blocks such a grippe block 230 in chain fashion, all of the links are oriented the same way and it is not necessary to turn one of the gripper blocks around. Thus, in FIG. 18, upper and lower phantom gripper blocks 230a are shown assembled to gripper block 230. The ear 234a of upper gripper block 230a is linked by pin 206 to ear 232 of gripper block 230, and similarly, ear 232a of lower gripper block 230a is linked to ear 234 of gripper block 230 in the same manner by pin 206a. Since the gripper block 230 has but one ear on each end, it, like gripper block 200 previously described, lends itself well to modern mass production processes, such as molding, metal powder molding, casting, or the like processes.

The V-groove means for gripper blocks such as those disclosed hereinabove may be formed as a separate part and afterwards secured to a body means by suitable means, such as welding, brazing, bonding, or the like, or through use of blots, screws, or the like, or through use of dovetail slots, or similar securing means.

Figure 19:
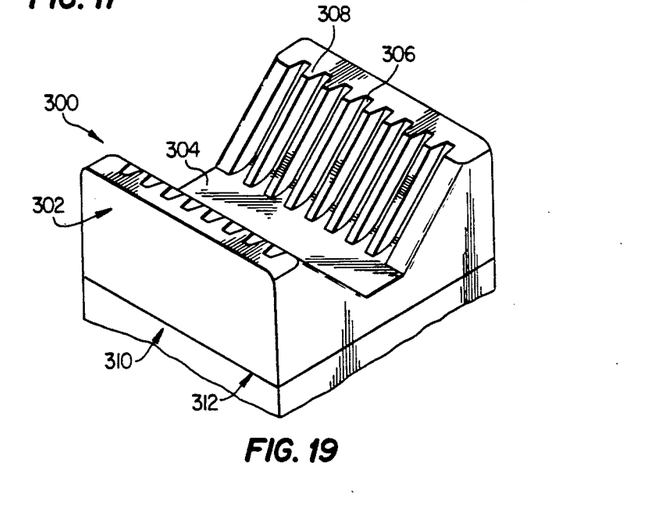
FIG. 19 is a fragmentary oblique view showing a gripper block of this invention and having its V-groove means formed of a separate part and then secured to a suitable body means.

In FIG. 19, it is seen that V-groove means 300 comprises a body 302 having formed thereon a V-groove 304 and with grooves 306 and ridges 308 which function in a manner which is identical to those illustrated and described hereinabove, for instance, such as V-grooves 170, grooves 172, and ridges 174 of FIGS. 15 and 16. After forming such V-groove means, by machining, or casting, molding, or the like, it is secured to body means 310 by suitable means as at 312. The complete gripper block thus formed is then ready for assembly into an endless chain for use in a machine such as a coil tubing injector such as that illustrated in FIG. 1, for instance.

It has been shown that the improved gripper body of this invention fulfills all of the objects set forth hereinabove and provides distinct advantages over the known prior art. It is understood that the foregoing description of the invention and the illustrative drawings which accompany the same are presented by way of explanation only and that changes in the shape of the gripper and arrangement of its elements may be had by those skilled in the art without departing from the true spirit of this invention.

I claim:

1. A gripper block for use in an endless chain in a device for moving a rod, pipe, coil tubing, cable, or the like object, longitudinally, as into or out of a well, said chain having a longitudinal axis, said gripper block comprising:
   (a) body means, said body means being formed with a longitudinal axis and opposite ends and with lateral sides;
   (b) means at said opposite ends of said body means for attachment of said body means into said endless chain of said device to form a link thereof; and
   (c) V-groove means comprising a pair of slanted planar surfaces carried on one of said lateral sides of said body means and extending parallel to said longitudinal axes of said body means and said endless chain for frictionally engaging said object wherein said slanted surfaces are formed with ridges running thereacross perpendicular to said longitudinal axis of said body means.

2. The gripper block of claim 1, wherein said pair of slanted surfaces form an included angle of approximately 90 degrees.

3. The gripper block of claim 1, wherein said V-groove means is formed integral with said body means.

4. The gripper block of claim 1, wherein said V-groove means is formed as a separate part and secured to said body means.

5. A gripper block for use in an endless drive chain in a device for moving a rod, pipe, coil tubing, or cable longitudinally, as into or out of a well, said chain having a longitudinal axis, said gripper block comprising:
   (a) body means, said body means being formed with a longitudinal axis, first and second ends, and an outwardly facing side surface;
   (b) attachment means at first and second ends of said body means, including:
      (i) tongue means at said first end of said body and having a hole extending transversely therethrough, and
      (ii) a pair of projections at said second end of said body means spaced apart to provide a slot for receiving the tongue of another like gripper block therebetween, said projections each having a hole extending therethrough alignable with said hole through said tongue for receiving a pin therethrough by which adjacent gripper blocks are connectable; and
   (c) gripping surface means comprising a pair of elongate flat gripping surfaces on an outwardly facing side surface, said pair of gripping surfaces extending longitudinally of said body means and parallel to said longitudinal axis of said endless chain and being tilted such that they diverge outwardly, forming a V-groove having an included angle of substantially 90 degrees wherein said pair of tilted gripping surfaces are provided with spaced apart grooves providing ridges therebetween, and said ridges extend perpendicularly to said longitudinal axis of said body means.

6. The gripper block of claim 5, wherein said ridges and said grooves are formed with a profile similar to that of an Acme thread.

7. The gripper block of claim 6, wherein said ridges of said gripping surface means are spaced at about 0.18 inch to about 0.38 inch (4.57 to 9.7 millimeters), center to center.

8. The gripper block of claim 7, wherein said tilted gripping surfaces are spaced apart and said V-groove of the width of said body means.

9. A gripper block for use in an endless drive chain in a device for moving a rod, pipe, coil tubing, or cable longitudinally, as into or out of a well, said gripper block comprising:
   (a) body means, said body means being formed with a longitudinal axis, first and second ends, and at least one outwardly facing side surface;
   (b) attachment means at the ends of said body means, including: a first ear on said first end of said body means and at one side thereof and having a hole extending transversely therethrough, and a second ear on said second end of said body means and on the same side thereof and having a hole extending transversely therethrough, each of said ears being alignable with corresponding like gripper blocks for receiving a pin therethrough by which adjacent gripper blocks are linkable together in chain fashion; and
   (c) gripping surface means comprising a pair of elongate flat gripping surfaces on said outwardly facing side surface, said pair of gripping surfaces extending longitudinally of said body means and being tilted such that they diverge outwardly, forming a V-groove having an included angle of substantially 90 degrees.

10. The gripper block of claim 9, wherein said pair of tilted gripping surfaces are provided with spaced apart grooves providing ridges therebetween, and said ridges extend perpendicularly to said longitudinal axis of said body means.

11. The gripper block of claim 10, wherein said ridges and said grooves are formed with a profile similar to that of an Acme thread.

12. The gripper block of claim 11, wherein said ridges of said gripping surface means are spaced at about 0.18 inch to about 0.38 inch (4.57 to 9.7 millimeters), center to center.

13. The gripper block of claim 12, wherein said tilted gripping surfaces are spaced apart and said V-groove formed thereby has a bottom of between 7 and 30 percent of the width of said body means.

14. A gripper block for use in an endless drive chain in a device for moving a rod, pipe, coil tubing, or cable longitudinally, as into or out of a well, said gripper block comprising:

(a) body means, said body means being formed with a longitudinal axis, first and second ends and first and second sides, and at least one outwardly facing side surface;

(b) attachment means at the ends of said body means, including: a first ear on said first end of said body means and located at said second side thereof and having a hole extending transversely therethrough, and a second ear on said second end of said body means and also located at said first side thereof and having a hole extending transversely therethrough, each of said ears being alignable with corresponding ears on adjacent like gripper blocks for receiving a pin therethrough by which adjacent gripper blocks are connectable; and (c) gripping surface means comprising a pair of elongate flat gripping surfaces on said outwardly facing side surface, said pair of gripping surfaces extending longitudinally of said body means and being tilted such that they diverge outwardly, forming a V-groove having an included angle of substantially 90 degrees.

15. The gripper block of claim 14, wherein said pair of tilted gripping surfaces are provided with spaced apart grooves providing ridges therebetween, and said ridges extend perpendicularly to said longitudinal axis of said body means.

16. The gripper block of claim 15, wherein said ridges and said grooves are formed with a profile similar to that of an Acme thread.

17. The gripper block of claim 16, wherein said ridges of to about 0.38 inch (4.57 to 9.7 millimeters), center to center.

18. The gripper block of claim 17, wherein said tilted gripping surfaces are spaced apart and said V-groove formed thereby has a bottom of between 7 and 30 percent of the width of said body means.

* * * * *